United States Patent [19]
Balling et al.

[11] Patent Number: 6,134,388
[45] Date of Patent: Oct. 17, 2000

[54] CAMERA HOUSING AND ACCESSORY BELT CLIP/CARRY STRAP RETAINER WHICH SECURES HOUSING PARTS TOGETHER

[75] Inventors: Edward N. Balling, Rochester; Jeffrey A. Solomon, Spencerport, both of N.Y.

[73] Assignee: Eastman Kodak Company, Rochester, N.Y.

[21] Appl. No.: 09/309,081

[22] Filed: May 10, 1999

[51] Int. Cl.[7] .................................................. G03B 17/02
[52] U.S. Cl. ............................. 396/6; 396/423; 396/535; 224/255; 224/269; 224/908
[58] Field of Search .............. 396/6, 423, 424, 396/535, 541, 544; 724/255, 269, 270, 908

[56] References Cited

U.S. PATENT DOCUMENTS

D. 254,790  4/1980  Waaske .
1,572,267  2/1926  Brehm et al. .
2,238,480  4/1941  Tierney .
3,209,968  10/1965  Flanagan .
5,250,973  10/1993  Pijlman .
5,711,424  1/1998  Kiesow .

Primary Examiner—Howard B. Blankenship
Attorney, Agent, or Firm—Roger A. Fields

[57] ABSTRACT

A camera housing includes a front cover part and a rear cover part which have two adjacent end portions provided with respective concavities that similarly extend inward to define adjacent concave surfaces of the two end portions. The two end portions continue over the concavities to form adjacent ribs spaced from the concave surfaces to permit an accessory for the camera housing to fit between the ribs and the concave surfaces. The accessory has at least one fastener that fits between the ribs and the concave surfaces and engages the ribs to hold the ribs together in order to prevent the front and rear cover parts from separating at the two end portions.

9 Claims, 7 Drawing Sheets

CAMERA HOUSING AND ACCESSORY BELT CLIP/CARRY STRAP RETAINER WHICH SECURES HOUSING PARTS TOGETHER

CROSS-REFERENCE TO RELATED APPLICATION

Reference is made to commonly assigned co-pending application Ser. No. 09/273,016 entitled CAMERA HOUSING WITH INTEGRAL CARRY STRAP RETAINER, and filed Mar. 19, 1999 in the name of Jeffrey A. Solomon.

The cross-referenced application is incorporated into this application.

FIELD OF THE INVENTION

The invention relates generally to the field of photography, and in particular to cameras. More specifically, the invention relates to a housing for a camera and an accessory that attaches to the housing.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed film roll prewound from the film cartridge onto a film take-up spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the latent images and make prints for the customer. At least some of the used camera parts may be recycled, i.e. reused, to remanufacture the camera.

One-time-use cameras typically do not include any belt clip or carry strap.

Prior Art Problem

Since the one-time-use camera is relatively small, it is advantageous to connect a belt clip or carry strap to the camera in order to facilitate holding the camera. However, known retainers which secure various belt clips or carry straps to cameras typically protrude from one end of the camera. This, effectively, adds to the size of the camera by creating a protuberance at the end of the camera.

The Cross-Referenced Application

The cross-referenced application discloses a housing for a one-time-use camera which includes a front cover part and a rear cover part that are connected to one another. The front cover part and the rear cover part have two adjacent end portions provided with respective concavities that similarly extend inward to define aligned concave surfaces of the two end portions. The two end portions continue over the concavities to form a rib-like carry strap retainer spaced from the concave surfaces to permit an elongate carry strap to be threaded between the carry strap retainer and the concave surfaces. This provides a compact design.

SUMMARY OF THE INVENTION

According to one aspect of the invention, a camera housing including a front cover part and a rear cover part, and an accessory for the camera housing, are characterized in that:

the front cover part and the rear cover part have two adjacent end portions provided with respective concavities that similarly extend inward to define adjacent concave surfaces of the two end portions, and the two end portions continue over the concavities to form adjacent ribs spaced from the concave surfaces to permit the accessory to fit between the ribs and the concave surfaces; and the accessory has at least one fastener that fits between the ribs and the concave surfaces and engages the ribs to hold the ribs together in order to prevent the front and rear cover parts from separating at the two end portions.

According to another aspect of the invention, an accessory for holding a pair of front and rear cover parts of a camera housing together at adjacent ribs along respective end portions of the front and rear cover parts, comprises:

a pair of parallel hook portions and a single end protuberance spaced from the hook portions to receive the adjacent ribs between the hook portions and the end protuberance.

DETAILED DESCRIPTION OF THE INVENTION

Figure 1:
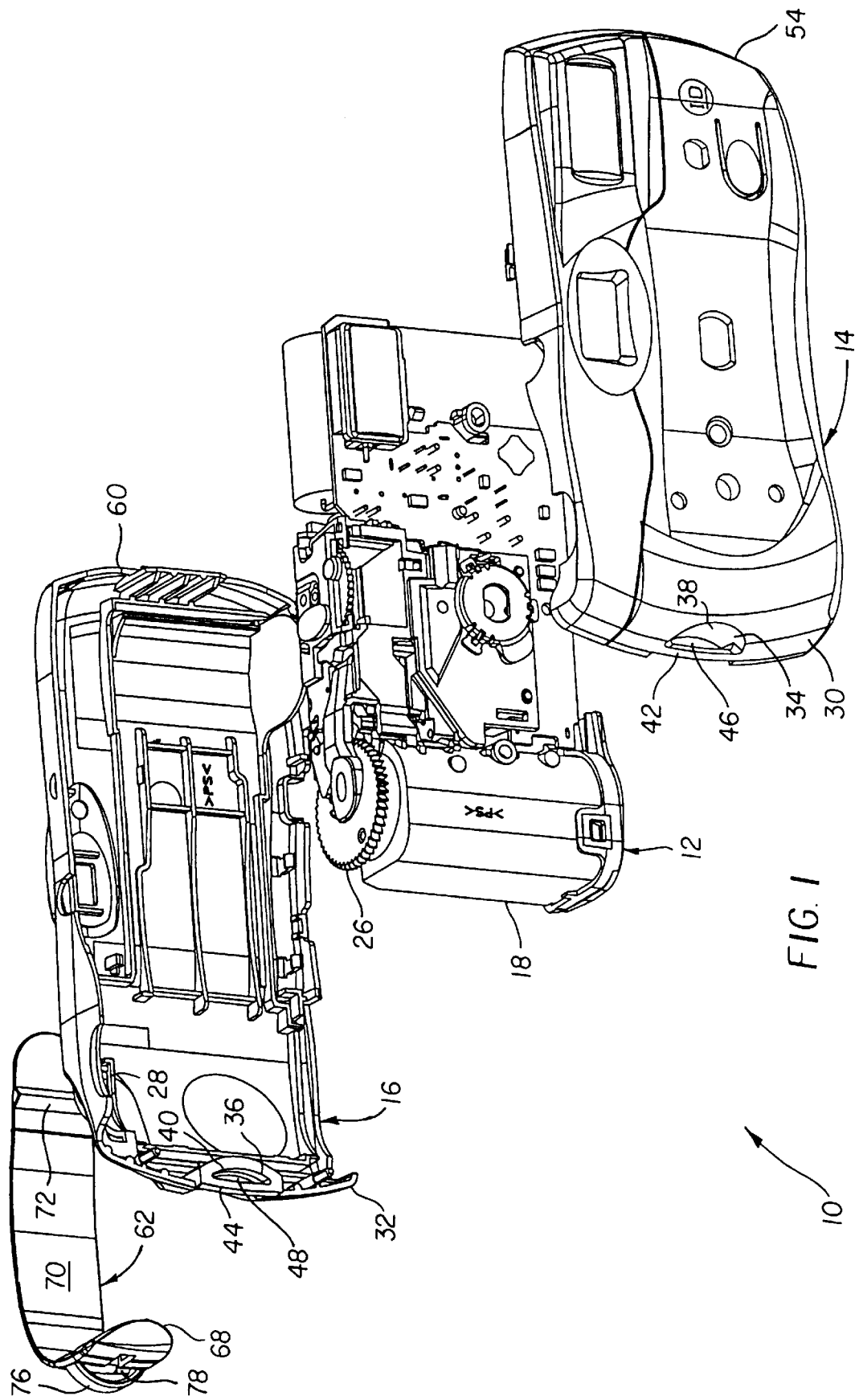
FIG. 1 is a front exploded perspective view of a one-time-use camera and an accessory, illustrating a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

The Camera

Referring now to the drawings, FIGS. 1–6 show a one-time-use camera 10 which includes a plastic opaque main body part 12 and a pair of plastic opaque front and rear cover parts 14 and 16 which are adapted to contain the main body part between them. The front and rear cover parts 14 an 16 when secured to one another form a compact camera housing for the main body part 12.

As is known, the main body part 12 has a rearwardly open cartridge receiving chamber 18 for a conventional film cartridge 20 and a rearwardly open film supply chamber 22. See FIG. 2. During manufacture, a filmstrip (not shown) is prewound into an unexposed film roll (not shown) to be located in the film supply chamber 22. A rearwardly open backframe opening 24 is arranged between the cartridge receiving chamber 18 and the film, supply chamber 22 for exposing successive frames of the filmstrip.

A film winding thumbwheel 26 rotatably supported on the main body part 12 protrudes outwardly from a slot 28 in the rear cover part 16 and has a depending coaxial stem in coaxial engagement with an exposed top end of a film spool inside the film cartridge 20. See FIGS. 1 and 2. Manual winding rotation of the film winding thumbwheel 26 counter-clockwise in FIG. 1 similarly rotates the film spool inside the film cartridge 20 to wind each exposed frame of the filmstrip into the film cartridge and to advance an unexposed frame of the filmstrip from the unexposed film roll to the backframe opening 24.

Figure 2:
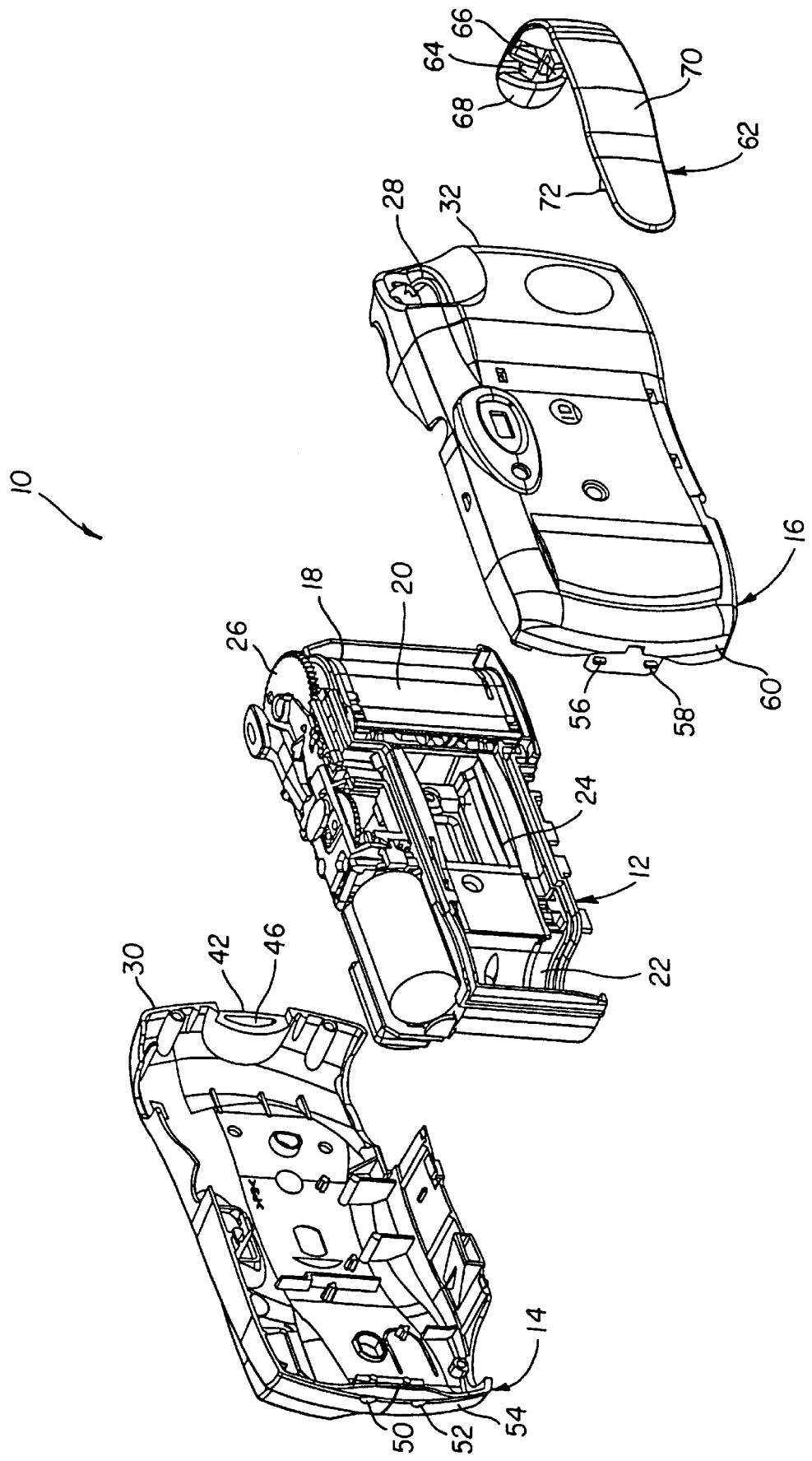
FIG. 2 is a rear perspective view similar to FIG. 1.
Figure 3:
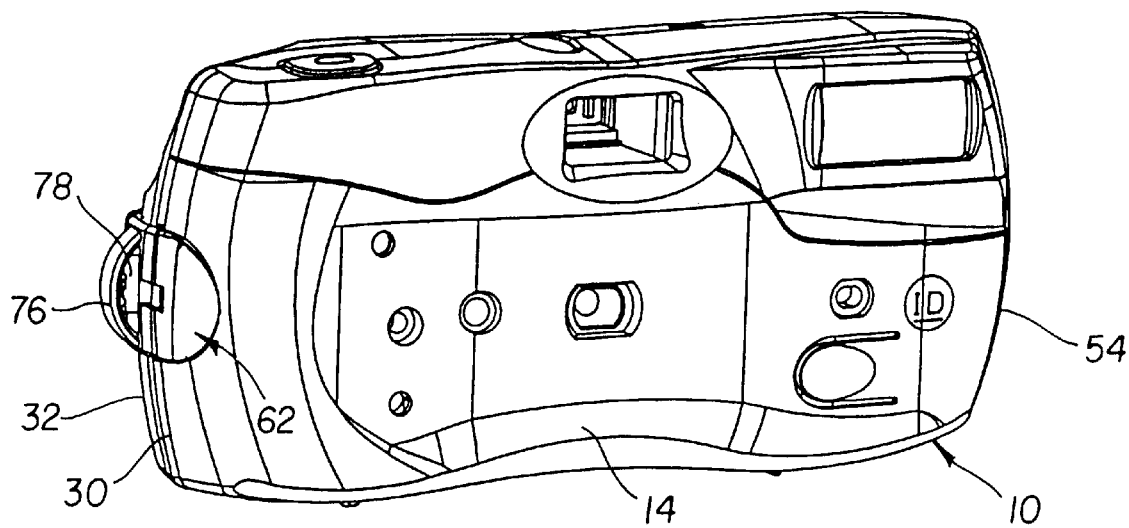
FIG. 3 is a front assembled perspective view of the camera and the accessory.
Figure 4:
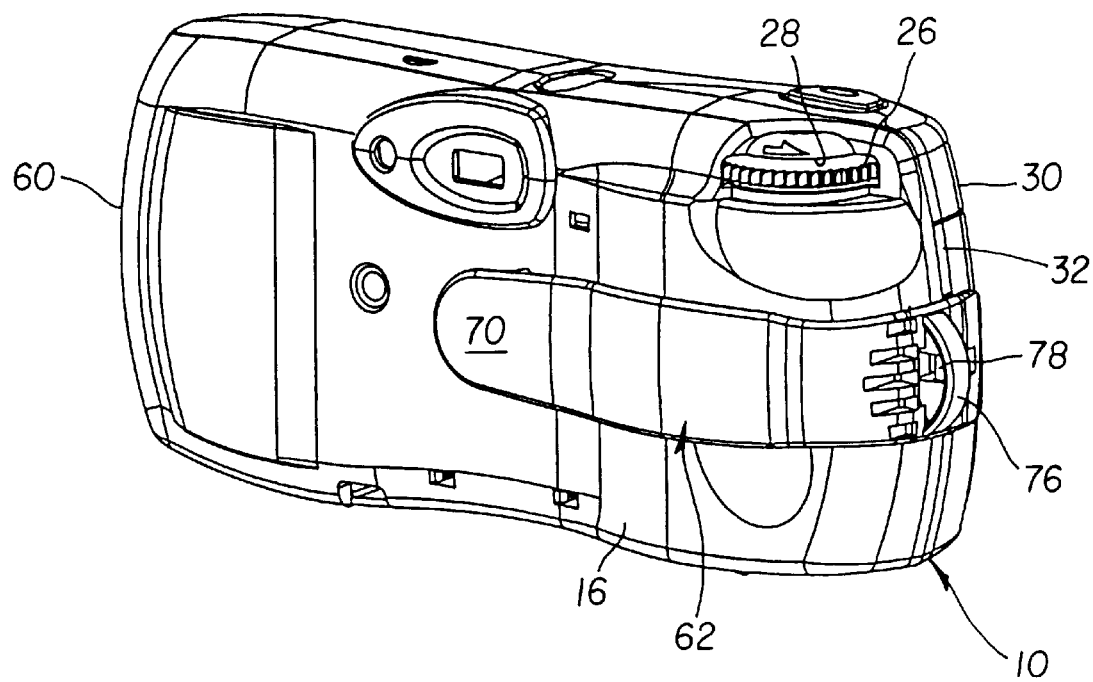
FIG. 4 is a rear assembled perspective view similar to FIG. 3.

The front cover part 14 and the rear cover part 16 have similar (corresponding) adjacent end portions 30 and 32, i.e., the left end portions of the front and rear cover parts in FIG. 1, the right end portions of the front and rear cover parts in FIG. 2. The two end portions 30 and 32 are each uniformly curved and are similarly contoured.

The front cover part 14 and the rear cover part 16 have respective adjacent concavities 34 and 36 that curve inward at the two end portions 30 and 32 of the front and rear cover parts to define adjacent aligned concave surfaces 38 and 40 of the two end portions. Preferably, the two concavities 34 and 36 including the two concave surfaces 38 and 40 are co-planar. See FIGS. 1, 5 and 6.

Figure 5:
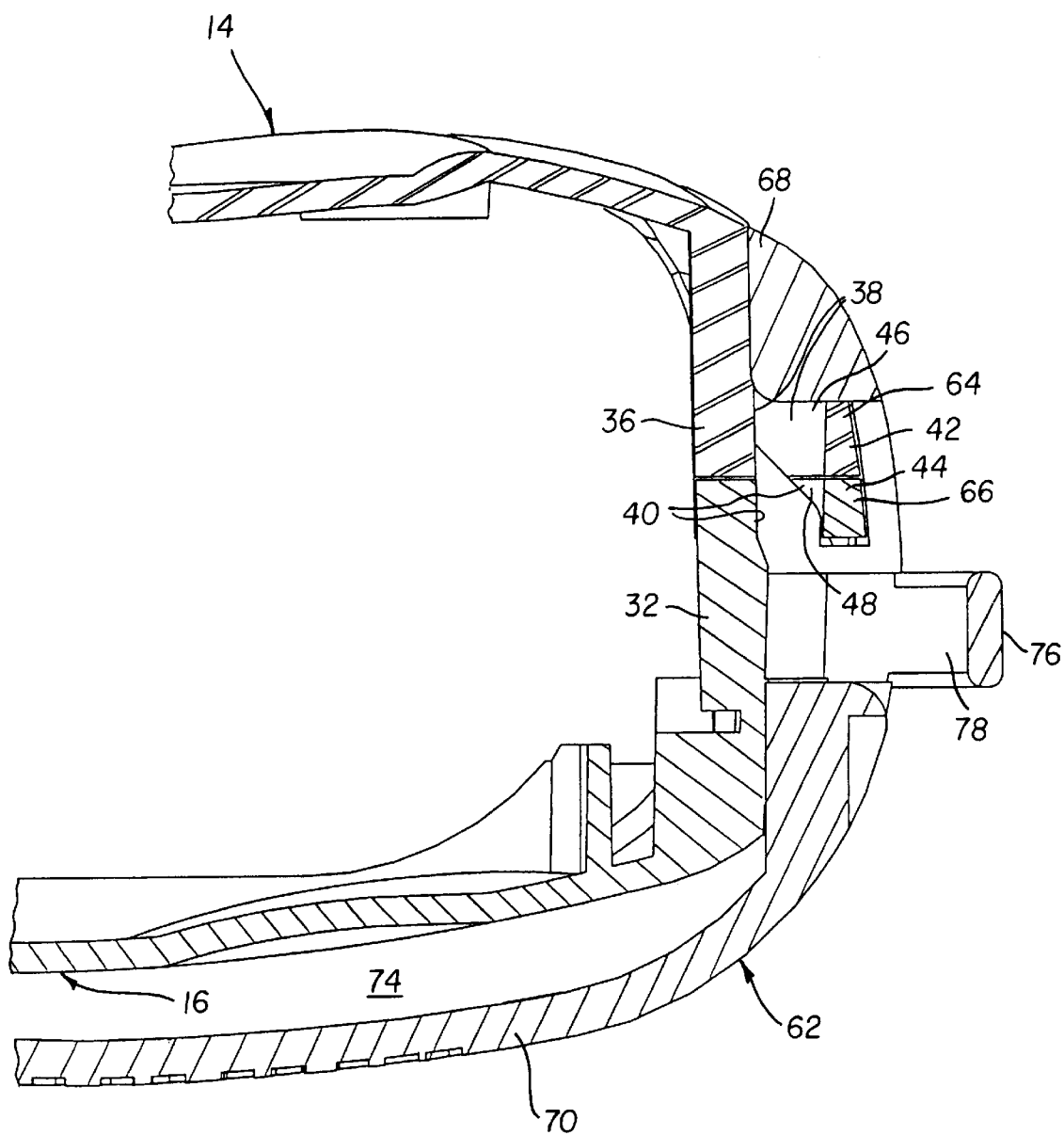
FIG. 5 is a sectional view of the accessory and one end of the camera, showing the accessory connected to the end of the camera.
Figure 6:
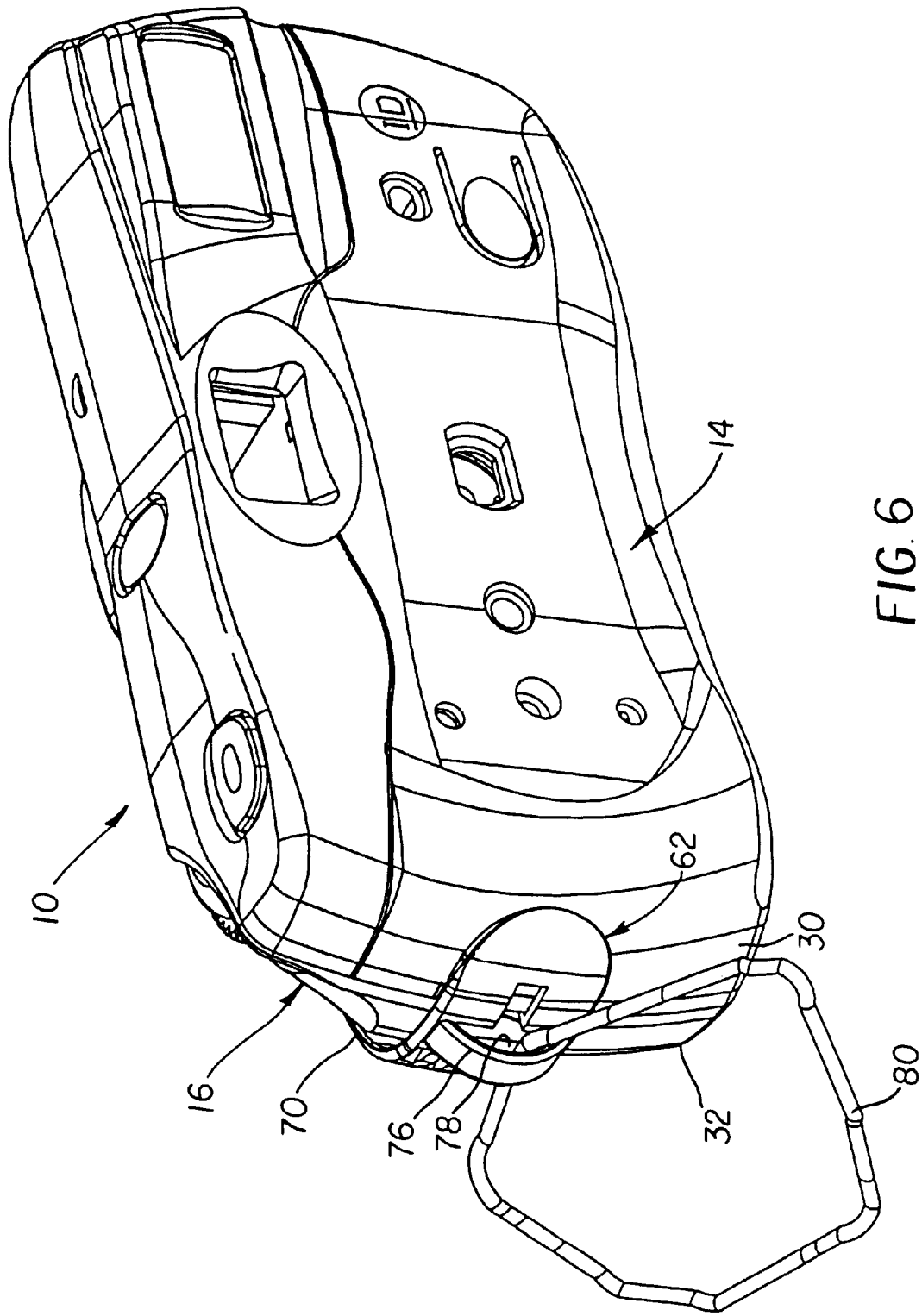
FIG. 6 is a front assembled perspective view similar to FIG. 3, showing a carry or wrist strap connected to the accessory.

The two end portions 30 and 32 of the front and rear cover parts 14 and 16 continue over the concavities 34 and 36 in the end portions as shown in FIGS. 1 and 5, in contour with the end portions, to form respective adjacent aligned ribs 42 and 44. The ribs 42 and 44 are spaced from the concave surfaces 38 and 40 to leave respective openings 46 and 48.

Respective holes 50 and 52 in an opposite end portion 54 of the front cover part 14 receive two hooks 56 and 58 in an opposite end portion 60 of the rear cover part to hold these two end portions together. See FIG. 2. Preferably, there are no holes and hooks similar to the holes 52, 54 and the hooks 56, 58 in the two end portions 30 and 32 of the front and rear cover parts 14 and 16 (although they can be provided). See FIG. 1.

The Accessory

Figure 7:
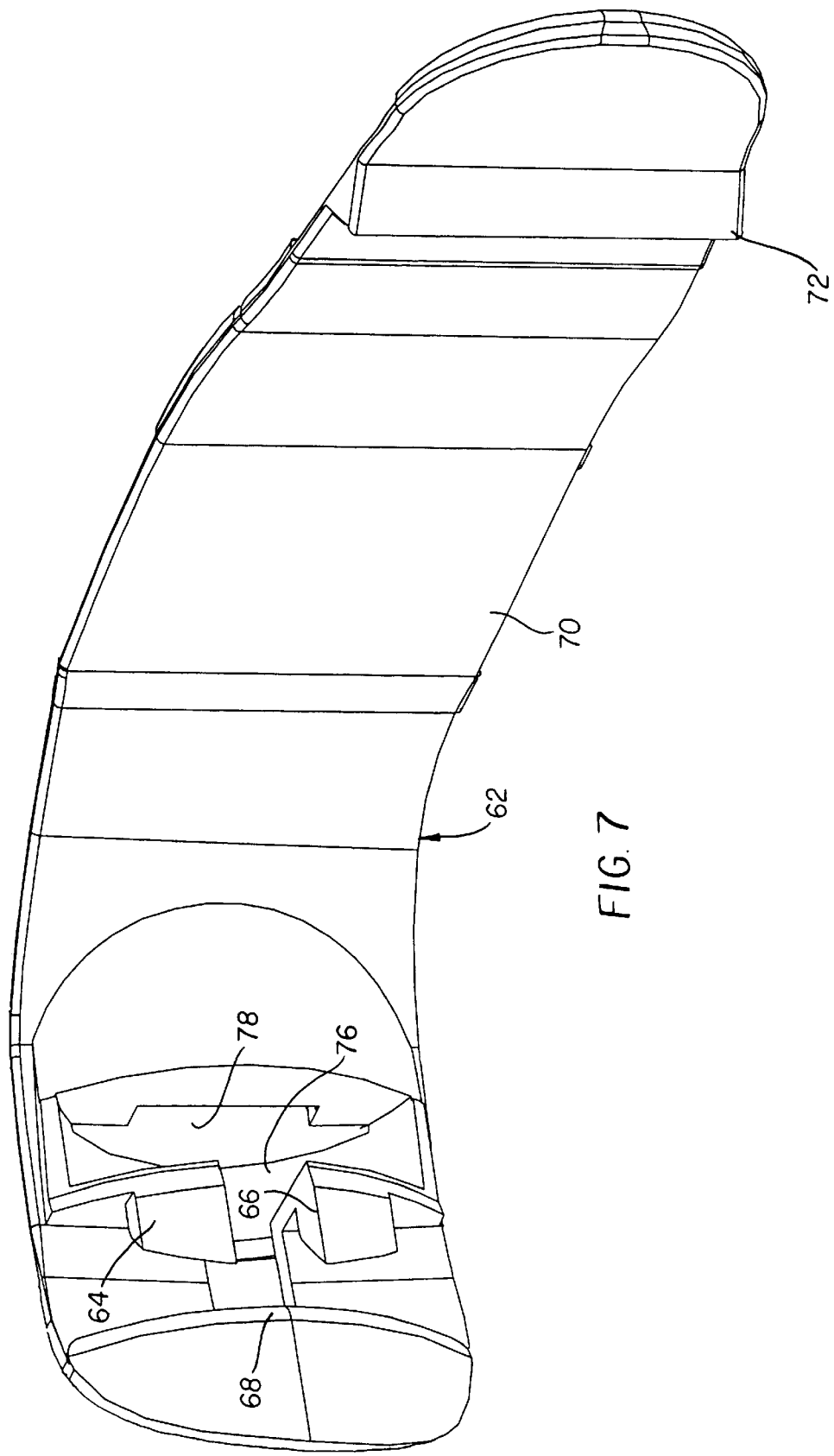
FIG. 7 is an enlarged perspective view of the accessory.
Figure 8:
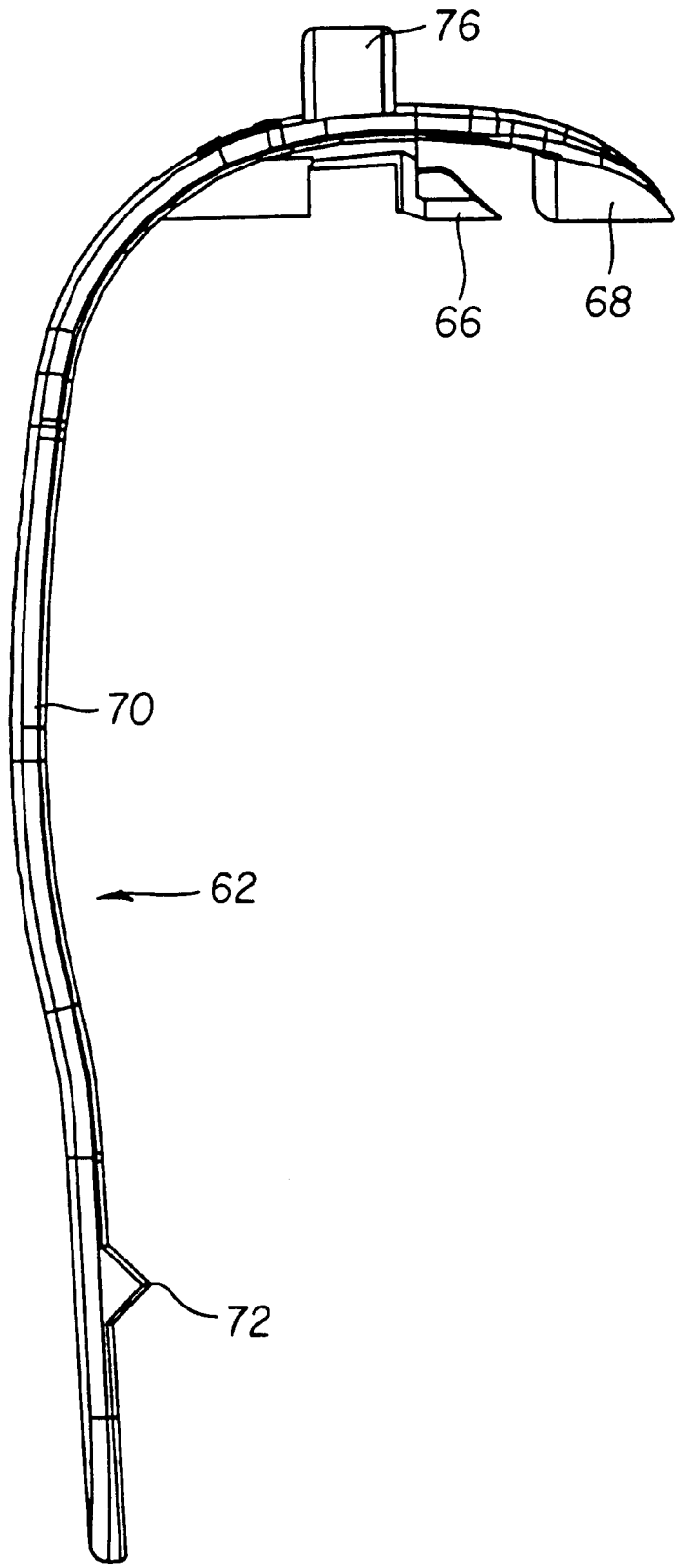
FIG. 8 is side view of the accessory.

An accessory 62 has a pair of parallel fastener hook portions 64 and 66 and a single fastener end protuberance 68 spaced from the hook portions. See FIGS. 7 and 8. The two hook portions 64, 66 and the single end protuberance 68 are interconnected resiliently. This readily permits them to be manually flexed farther apart relative to one another to receive the two adjacent ribs 42 and 44 of the two end portions 30 and 32 of the front and rear cover parts 14 and 16 between them, as shown in FIG. 7. The two hook portions 64, 66 and the single end protuberance 68 thus hold the two ribs 42 and 44 together in order to prevent the end portions 30 and 32 from separating.

A longitudinal portion 70 of the accessory 62 extends along the rear cover part 16 to serve as a belt clip for the one-time-use camera 10. See FIGS. 4, 5, 7 and 8. The longitudinal portion 70 has a projecting spacer 72 that rests against the rear cover part 16 to effect a slight gap 74 between the longitudinal portion and the rear cover part.

The accessory 62 has a half-loop carry strap retainer 76 proximate the two hook portions 64 and 66, which defines an opening 78 for a wrist strap 80. See FIGS. 5–7.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. film supply chamber
24. backframe opening
26. thumbwheel
28. slot
30. end portion
32. end portion
34. concavity
36. concavity
38: concave surface
40. concave surface
42. rib
44. rib
46. opening
48. opening
50. hole
52. hole
54. end portion
56. hook
58. hook
60. end portion
62. accessory
64. hook portion 66. hook portion
68. end protuberance
70. longitudinal portion
72. projecting spacer
74. gap
76. carry strap retainer
78. opening
80. wrist strap

What is claimed is:

1. A camera housing including a front cover part and a rear cover part, and an accessory for said camera housing, are characterized in that:

said front cover part and said rear cover part have two adjacent end portions provided with respective concavities that similarly extend inward to define adjacent concave surfaces of said two end portions, and said two end portions continue over said concavities to form adjacent ribs spaced from said concave surfaces to permit said accessory to fit between said ribs and said concave surfaces; and said accessory has at least one fastener that fits between said ribs and said concave surfaces and engages said ribs to hold said ribs together in order to prevent said front and rear cover parts from separating at said two end portions.

2. A camera as recited in claim 1, wherein said accessory has a resilient longitudinal portion that extends along said rear cover part to form a belt clip for said camera housing.

3. A camera as recited in claim 2, wherein said longitudinal portion has a projecting spacer to effect a gap between said longitudinal portion and said rear cover part.

4. A camera as recited in claim 2, wherein said accessory has a carry strap retainer proximate said fastener to be close to said two end portions.

5. A camera as recited in claim 1, wherein said fastener has a hook portion that protrudes between said ribs and said concave surfaces and has another portion spaced from said hook portion to capture said ribs between said hook portion and said other portion.

6. A camera as recited in claim 1, wherein said hook portion is resilient to permit it to be flexed to be removed from between said ribs and said concave surfaces release said ribs.

7. A camera housing including a front cover part and a rear cover part, and an accessory for said camera housing, are characterized in that:

said front cover part and said rear cover part have two adjacent end portions provided with respective concavities that similarly extend inward to define adjacent concave surfaces at said two ends, and said two end portions continue over said concavities to form adjacent ribs spaced from said concave surfaces to permit said accessory to fit between said ribs and said concave surfaces; and said accessory has at least one fastener that engages said ribs to hold said ribs together in order to prevent said front and rear cover parts from separating at said two end portions and which is resilient to permit said fastener to be disengaged from said ribs in order to allow said two end portions to be separated.

8. An accessory for holding a pair of front and rear cover parts of a camera housing together at adjacent ribs along respective end portions of the front and rear cover parts, comprising:

a pair of parallel hook portions and a single end protuberance spaced from said hook portions to receive the adjacent ribs between said hook portions and said end protuberance.

9. An accessory as recited in claim 8, wherein said hook portions and said end protuberance are interconnected resiliently to permit said hook portions and said end protuberance to be flexed farther relative to one another to receive the adjacent ribs between said hook portions and said end protuberance.

\* \* \* \* \*